United States Patent [19]

Gauthier et al.

[11] Patent Number: 4,897,917

[45] Date of Patent: Feb. 6, 1990

[54] METHOD OF ASSEMBLING COMPONENTS OF AN ELECTROCHEMICAL GENERATOR USING THIN FILMS OF LITHIUM

[75] Inventors: Michel Gauthier, La Prairie-Quebec; Andre Belanger, Sainte Julie, both of Canada

[73] Assignees: Societe Nationale Elf Aquitaine, Courbevoie, France; Hydro-Quebec, Quebec, Canada

[21] Appl. No.: 218,243

[22] Filed: Jul. 13, 1988

[51] Int. Cl.$^4$ ............................................. H01M 6/18
[52] U.S. Cl. .................................. 29/623.3; 29/623.5; 72/46
[58] Field of Search ........................... 29/623.3, 623.5; 429/192; 72/46

[56] References Cited

U.S. PATENT DOCUMENTS

| | | | |
|---|---|---|---|
| 3,721,113 | 3/1973 | Hovsepian | 72/46 |
| 4,594,299 | 6/1986 | Cook et al. | 29/623.3 |
| 4,615,961 | 10/1986 | Park et al. | 29/623.5 |
| 4,621,035 | 11/1986 | Bruder | 429/152 |

FOREIGN PATENT DOCUMENTS

| | | |
|---|---|---|
| A0143566 | 6/1985 | European Pat. Off. . |
| A0146245 | 6/1985 | European Pat. Off. . |
| A0147929 | 7/1985 | European Pat. Off. . |
| A2148586 | 5/1985 | United Kingdom . |

*Primary Examiner*—Donald L. Walton
*Attorney, Agent, or Firm*—Oblon, Spivak, McClelland, Maier & Neustadt

[57] ABSTRACT

In order to assemble the components of an electrochemical generator using lithium, which are in the form of thin films and comprise a lithium- or lithium alloy-based negative electrode and a solid polymer electrolyte with conduction using the lithium ion, an intermediate assembly is used which consists of a thin film of lithium supported by a film of inert plastic with controlled adhesion to the lithium, as a precursor of the negative electrode. This intermediate assembly can be produced, inter alia, by rolling a sheet of lithium between two films of inert plastic.

11 Claims, No Drawings

METHOD OF ASSEMBLING COMPONENTS OF AN ELECTROCHEMICAL GENERATOR USING THIN FILMS OF LITHIUM

BACKGROUND OF THE INVENTION

The invention relates to a method for assembling the components of an electrochemical generator using lithium, with said components being in the form of thin films.

DISCUSSION OF THE BACKGROUND

The electrochemical generators using lithium covered by the invention are generators produced in the form of thin films and comprising a negative electrode composed of a sheet of lithium or an alloy thereof, a composite positive electrode and a solid electrolyte composed of the solution of a salt in a macromolecular material. Such generators are described, for example, in the European patent issued on Feb. 15, 1984 under No. 0013199 entitled: "Electrochemical generators for the production of current and materials for producing same".

For the production of such generators and in order to satisfy the thinness requirements of the various layers, it is necessary to have thin films of lithium, that is, films with a thickness of less than 40 microns, but, however, more than 1 or 2 microns. In effect, in this technology, the surface capacities of the positive electrodes can vary from 1 Coulomb to 20 Coulombs per $cm^2$, which, with regard to the lithium, is thicknesses on the order of 1 to 40 microns, depending on the low excess of lithium which it is desired to retain in relation to the capacity of the positive electrode. The presence of a more significant excess of lithium corresponding to greater thicknesses of lithium, for example over 40 microns is detrimental in terms of energy density stored per unit of volume due to the large surfaces of batteries necessary for a technology based on thin polymer films. In addition, it is worthwhile limiting the excess of lithium in view of its cost which can represent an important factor of the overall cost of lithium accumulators.

Moreover, the technology used for the production of such generators, resides in the continuous production, handling and assembly of the components of the complete battery, generally from the individual constituent components of the battery, that is, anode, electrolyte and cathode, which are generally made, dried and stocked separately until the final battery assembly phase. This stocking of said components ordinarily takes the form of a roll from which the material can be continuously removed in order to carry out the assembly of the battery. It is essential for the three constituents—anode, electrolyte and cathode—to have sufficient mechanical holding that they can be taken at a good speed through various equipment, such as rolling machines and other devices enabling the operations of transfer, gluing and final battery assembly to be carried out.

The electrolyte bears such stresses very well since it is normally handled on a detachable polymeric support which is well adapted to the mechanical needs. The same is true for the positive electrode which, most of the time, is associated with a metal conductive support which acts as a current collector.

On the other hand, for the negative lithium-based electrode, the opposite is the case. In effect, the metal lithium at thicknesses of less than 50 microns no longer has the mechanical holding necessary for handling in the assembly methods mentioned above. In addition to its tendency to stick onto almost all surfaces, it is difficult to transport with good centering control (alignment) since it is soft and non-resilient.

SUMMARY OF THE INVENTION

The method in accordance with the invention, is an improvement in the method of assembling the components of an electro-chemical generator using lithium, with said components being in the form of thin films and comprising, on the one hand, a lithium- or lithium alloy-based negative electrode and, on the other hand, a component containing at least one apparent thin film of a solid electrolyte, with said method enabling easy handling and assembly of the lithium or lithium alloy film and thus overcoming the above-indicated disadvantages.

The method of assembly in accordance with the invention is characterized in that a negative electrode precursor is used which consists of an intermediate assembly formed from a thin film of lithium or lithium alloy supported by an inert plastic film having controlled adhesion to the lithium such that the bond of the lithium-based film to the plastic film is sufficient to permit the handling of said intermediate assembly but is less than the bond of the lithium film to the solid polymer electrolyte of the component containing said electrolyte, that the free metal surface of the intermediate assembly is applied against the polymer electrolyte of the component containing said electrolyte by working at a temperature and under a pressure sufficient to cause the lithium of the intermediate assembly to adhere to said electroyte, and that then, possibly, the plastic film is totally or partially separated from the lithium by peeling.

DETAILED DESCRIPTION OF THE PREFERRED EMBODIMENTS

The above-indicated intermediate assembly preferably further contains a second inert plastic film in contact with the lithium, with said film having practically no adhesion to the lithium.

The intermediate assembly used in the method of assembly in accordance with the invention can be obtained by any method providing a thin film of lithium supported by a film of inert plastic with controlled adhesion to the lithium.

In particular, the intermediate assembly can be obtained by rolling the lithium between two inert plastic films, one of which is easily peelable and the other is the film having said controlled adhesion to the lithium, with said controlled adhesion being intermediate between the adhesion of the very easily peelable film to the lithium and the adhesion of the lithium to the solid polymer electrolyte and, in this case, the surface of the intermediate assembly bearing the very easily peelable film is applied against the solid polymer electrolyte after said film has been removed by peeling.

The intermediate assembly can also be formed by rolling the lithium between two inert plastic films which are very easily peelable. In this embodiment, the transfer of the lithium can then be carried out onto a film of inert plastic having controlled adhesion to the lithium, with said adhesion being sufficient to enable transport through the rollers, in order to obtain an intermediate assembly formed of one thin film of lithium supported by an inert plastic film with controlled adhesion to the lithium and possibly covered with a film of inert plastic which is very easily peelable.

The intermediate assembly can further be obtained by depositing a thin film of lithium onto the inert plastic film with controlled adhesion to the lithium using a technique for the deposit of melted lithium or a simple or lithium-assisted evaporation technique, for example evaporation assisted by cathode spraying (sputtering) or electron bombardment, even a plasma technique, or even a technique similar to that of painting which uses a suspension of fine particles of lithium in a suitable medium such as an olefin oil.

The film of inert plastic with controlled adhesion to the lithium, which is combined with the lithium to comprise the intermediate assembly, as well as the very easily peelable plastic film which is present in the intermediate assemblies formed by rolling as indicated above, can be selected from the various inert plastic films which have the desired adhesion to lithium or an absence of adhesion, as appropriate. Polypropylene or polyethylene films are preferably used. The state of the surface of the inert plastic film and the physico-chemical nature of said film can be modified so as to control its adhesion to the lithium, that is, the film can be adhesive then easily removable or even non-adhesive.

For example, a polyethylene or polypropylene film can be treated using the so-called "crown effect" technique, which essentially consists of subjecting the film to high voltage electrical discharges so as to produce very strong oxidations at the surface of said film which results in an increase in adhesion properties. In particular the inert plastic film, particularly polypropylene or polyethylene film, has one surface practically not adhering to the lithium while its other surface has been treated using the crown effect to provide it with the desired controlled adhesion to the lithium, with said latter surface being in contact with the lithium film.

The temperature at which the application of the intermediate assembly onto the polymer electrolyte is carried out is preferably less than 60° C. so as not to affect the surface chemistry of the lithium.

The component containing at least one thin apparent film of solid polyme electrolyte with conduction through the lithium ion, which is assembled in the intermediate assembly, can be composed solely of a thin film of said electrolyte. Said component can also consist of a half-battery formed by a positive electrode i na thin film, one surface of which is covered with a solid polymer electrolyte film, with the resulting assembly then constituting a complete negative electrode with lithium/solid polymer electrolyte/positive electrode battery.

After carrying out the assembly between the component containing a thin apparent solid polymer electrolyte film with conduction using the lithium ion and the intermediate assembly, the inert plastic film with controlled adhesion to the lithium can be peeled at least locally to enable the collection of the current or the deposit of a metal collector.

The value of the method of assembly in accordance with the invention and of the intermediate assembly used in the carrying out said method resides in the ease with which they enable an electrochemical generator using lithium to be produced. In effect, for the production of such generators, it is necessary to be able to apply the lithium onto the solid polymer electrolyte layer. Since, in accordance with the invention, the lithium is supported by an easily removable plastic support, it is easy to transfer the lithium onto the electrolyte by using the plastic support as a mechanical support and then to remove said plastic support so as to create the electrochemical generator by rolling or by any other suitable method, after the possible deposit of metal current collectors, for example in nickel or in copper. The plastic support is removed after the transfer against the adhesive electrolyte by taking support against the other components of the battery, i.e., the electrolyte and the positive electrode provided or not with its current collector.

The electrochemical generators in accordance with the invention work on the use of a solid polymer electrolyte having a large amount of amorphous phases, since it is said phases which ensure the properties of conductivity. These amorphous phases also provide the polymer electrolyte with very strong adhesion properties, which enable the film to be removed from the plastic support without removing the lithium film from the electrolyte.

The advantages of this method of handling the lithium are, therefore, with regard to mechanical properties, strong resistance of the assembly, i.e., basically resistance to drawing, each of cutting the supported film or of transporting it through a machine enabling the transfer of the lithium and assembly of the complete battery. In fact, the lithium supported in this manner can be handled at all points like a plastic film.

At the level of the electrochemistry of such systems, one of the benefits of this type of assembly using transfer of lithium supported by an easily removable support is to conserve at all times the surface state of the lithium, that is, the uniformity and the chemical composition of said surface, so as to maximize performances during cycling and the interface characteristics of the negative electrode during its use in generators as thin films of the above-indicated type where the thickness of the electrolyte can be between 5 and 50 microns.

Another benefit of the method of assembly in accordance with the invention and the intermediate assembly used in carrying out said method is to enable the assembly of mono-surface batteries where the lithium is in contact with the solid polymer electrolyte on one of its surfaces and can, therefore, retain, at least locally, its plastic adhesive support. This is the case in particular with temporary rolls which will serve as the basis for the manufacture of several types or shapes of batteries and small wound devices where the collection of current with a negative electrode can be provided by the end. However, such lithium films supported by a polymer film can enable the final assembly of the generators to be carried out by transfer onto the second lithium surface of a second half-battery, after the film of polymer material covering said second surface has been removed. In this manner, therefore, bi-surface electrochemical generators can be obtained which enable the lithium film to be used to the maximum since it is in contact with the electrolyte by means of both its surfaces.

One of the methods for the production of the intermediate assembly consists of rolling a lithium film between two inert plastic films, one of which is very easily peelable and the other is either very easily peelable or indeed has controlled adhesion to the lithium as defined above. Such a method is of great benefit since it is easy to carry out and easily provides a thin film of lithium with a thickness of less than 50 microns without any risk for the surface state of the lithium rolled in this manner.

The production of thin films of lithium in the thicknesses required by electrochemical generator technology is not simple. In effect, the lithium is normally produced in bars using electrolysis. These bars are then purified to make the lithium of "battery" quality with a low nitrogen content (nitrides) and sodium. For the majority of "battery" needs, this lithium is then passed through an extrusion machine which produces lithium in thicknesses on the order of 150 microns when the widths are 7.5 cm or 10 cm. In this state, the lithium is not well suited for thin film electrochemical generators for two reasons, i.e., too great a thickness and insufficiently uniform surface.

Since lithium is a very ductile and malleable material, it can therefore be made thinner by rolling. However, as the adhesive properties of lithium are such that it tends to stick to all materials, including the noblest metals and chemically inert substances, this making thinner must be carried out using hard polymeric materials. In conventional methods, the lithium is directly rolled between two rollers made of a hard polymeric, lithium-resistant material. The surface quality of the lithium film obtained is thus dependent on the surface quality of these rollers, which are reused with each turn of the roller, with said rollers having a rapid tendency to becomem scratched and requiring regular resurfacing so as not to produce defects on the surface of the rolled lithium. As it is known that, in the technology for the production of electrochemical generators with lithium which uses thin films, it is imperative that the surface of the lithium film acting as the negative electrode be uniform, shiny as a mirror and devoid of any imperfection, it can be understood that the known above-indicated technique of rolling the lithium is very restrictive in the production of a lithium film with the required surface qualities for use in such technology. In addition, lithium made thinner to less than 50 microns no longer has much mechanical holding and tends to tear as soon as it handled slightly roughly or if one tires to take it thorugh an automatic method for battery assembly.

The method which provides the rolling of the lithium between two films of inert plastic as indicated above, ensures precise control of the state and the physicochemical nature of the surface of the lithium even at thicknesses below 50 microns. The film of lithium obtained in this manner, by rolling between two films of inert plastic with no imperfections, the surface of which is constantly being renewed, has surface qualities which are very superior to those of the lithium film produced using the known technique of direct rolling of the lithium between two rollers in a hard plastic material. In addition, by maintaining the contact of the plastic films with the lithium, the surface thereof can be protected against attacks by the gaseous phase or, also, the chemical composition of the lithium and its surface state can be controlled by treating the plastic film in advance with certain gases or certain liquids capable of reacting with the lithium in a controlled manner.

Moreover, the above-indicated method for rolling the lithium enables the use, for this rolling operation, of temperatures which are lower than the critical temperatures likely to create passivation layers at the surface of the lithium. This rolling method, therefore, prevents the appearance of such passivation layers at the surface of the lithium, which layers are certain to occur in the methods for coextrusion of the lithium in the molten state with polymers acting as protection and/or separating agents.

In accordance with one particular embodiment of the rolling method, a sheet of lithium is rolled, to a thickness of less than 50 microns, between two films of inert plastic, particularly polypropylene or polyethylene, which are very easily peelable, that is, practically not adhering to the lithium (removal force less than 100 g/cm). This technique enables the preparation of thin lithium up to thicknesses of approximately 15 to 20 microns. The surface of the thin lithium obtain in this manner is of excellent quality and reflects like a mirror. In addition, the lithium film is both supported and protected between the two films of plastic which have been used to produce it. The adhesion is just sufficient to maintain the lithium film in place between said films and it can be rolled as such because the two non-adhesive films have the capability of sliding in relation to one another during the intermediate rolling of the assembly produced. In the majority of cases, the above embodiment comprises a last step in accordance with which the lithium rolled in this manner is transferred onto a film of inert plastic adhering to the lithium with a sufficient controlled force to enable its high-speed transport through the rollers. If it is subsequently desired to remove said plastic film, the adhesion to the lithium must be less than that of the lithium to the solid polymer electrolyte or to the polymer electrolyte/electrode assembly. The plastic film with controlled adhesion could possible be maintained in place in order to be used as electrical insulation between the lithium and the current collector of the positive electrode in the batteries obtained by rolling. The other current collection (negative) could be provided by the lithium itself at its end or by lateral current supplies.

The invention will be more fully understood from reading the following examples, which are illustrative and non-limiting.

EXAMPLE 1

A lithium film with a thickness of 1.5 mm was first rolled between two films of polypropylene, each with a thickness on the order of 30 microns. During this rolling operation, the thickness of the lithium film was reduced to 30 microns without adhesion taking place between the lithium and its plastic support. The film of lithium was then rerolled using two films of plastic which were asymmetrical from the point of view of adhesion to the lithium, that is a first film of polypropylene, whose surface opposite the lithium had been treated using the crown effect and therefore had good adhesion to the lithium, and a second film of polypropylene which practically did not adhere to the lithium. The rolling machine was then adjusted such that the pressure produced in no significant way reduced the thickness of the lithium but was sufficient to ensure the adhesion of said film to the polypropylene support treated using the crown effect. The lithium film produced in this manner was rolled onto itself, after the slightly adhesive polypropylene film was removed, without there being problems of adhesion between the successive layers of lithium and the support film, with the back of the polyproplene film not having been treated using the crown effect.

These steps were carried out in an atmosphere of dry air containing less than 300 ppm $H_2O$ and the rolling of the lithium was carried out between two hard steel rollers at room temperature.

The roll of thin lithium supported on the polypropylene was then used in a second heating rolling machine so as to carry out the transfer of said lithium onto a polymer electrolyte film with a thickness of 80 microns composed of a film of ethylene polyoxide with a molecular weight of 5,000,000 in which lithium perchlorate was dissolved in an O/Li ratio of 15/1, with said electrolyte film being obtained by evaporation of a solution of its components in acetonitrile.

At the exit of the rolling machine, the polypropylene support was able to be detached from the lithium which was then cut into strips. These strips were then transferred at a temperature of about 90° C. onto positive composite electrodes containing vanadium oxide (40% by volume), acetylene black (10% by volume) and a macromolecular material composed of an ethylene polyoxide with a molecular weight of 900,000, prepared by evaporation on a nickel collector. A second nickel collector was also placed on the free surface of the lithium. In this manner, batteries were produced whose surface was 62 $cm^2$ and whose capacity was 196 Coulombs. It was verified that the rates of use obtained at 80° C. corresponded to those expected, taking into account the capacities brought into play and the performances generally expected from such assemblies. This therefore confirmed the quality of the transfers carried out from this free lithium, its each of use and the absence of interface problems.

EXAMPLE 2

A relatively thick film of lithium, approximately 135 microns, was rolled directly under dry air and with cold rollers between two films of polypropylene, one with a smooth surface and the other having a rough, therefore adhesive, surface, so as to produce a lithium film adhering to its polypropylene support. This lithium was then transferred at 80° C. onto an electrolyte formed by an ethylene oxide and glycidylether methyl copolymer, such as described in French Patent No. 2,542,322, in which lithium perchlorate was dissolved in an O/Li ratio of 20/1, with said electrolyte itself being deposited onto a positive electrode of the same type as the one described in Example 1 but in which the macromolecular material was the same copolymer as in the present example. The deposit of the electrolyte onto the electrode was carried out using an over-spreading/cross-linking technique. The positive electrode was first formed on a support composed, in this case, of the nickel collector film by coating on the shape the electrode precursor mixture containing benzoyl peroxide in an amount of 0.5% by weight in relation to the macromolecular material contained in said mixture, then drying the electrode layer produced in this manner at a temperature of between 80° C. and 100° C., which produced partial cross-linking of the macromolecular material of said electrode. A solution of the electrolyte in a solvent, for example acetonitrile, with said solution also containing benzoyl peroxide in an amount of 0.5% by weight of the electrolyte copolymer, was then spread on the electrode prepared in the above manner and the assembly obtained in this manner was then dried at a temperature of 80° C.

The cycling of the battery obtained in this manner (>100 deep discharge cycles) fully illustrated the absence of interface problems at the level of the lithium film. In addition, the method of preparation provided confirmation of the ease of handling the supported lithium.

We claim:

1. A method for assembling the components of an electrochemical generator, wherein said components are in the form of thin films and comprise, as a first component, a lithium- or lithium alloy-based negative electrode and, as a second component, at least one thin film of a solid polymer electrolyte capable of conducting lithium ions, said method comprising:
    (i) using a negative electrode precursor which consists of an intermediate assembly formed from a thin film of lithium or lithium alloy supported by an inert plastic film having controlled adhesion to the lithium such that the bond of the lithium-based film to said inert plastic film is sufficient to permit the handling of said intermediate assembly but is less than the bond of the lithium film to the solid polymer electrolyte of the component containing said electrolyte; and
    (ii) applying the free metal surface of said intermediate assembly against said solid polymer electrolyte of the component containing said electrolyte by working these at a temperature and under a pressure sufficient to cause the lithium of said intermediate assembly to adhere to said solid polymer electrolyte.

2. The method of claim 1, comprising (iii) separating totally or partially said plastic film from the lithium by peeling.

3. The method of claim 1, comprising (i) obtaining said intermediate assembly by rolling the lithium between two films of inert plastic material, one of which is very easily peelable and the other is said film having said controlled adhesion to the lithium, wherein said controlled adhesion is intermediate between the adhesion of the very easily peelable film to the lithium and the adhesion of the lithium to said solid polymer electrolyte; and (ii) applying the surface of said intermediate assembly bearing the very easily peelable film against said solid polymer electrolyte after said very easily peelable film has been removed by peeling.

4. The method of claim 1, comprising obtaining said intermediate assembly by depositing the thin film of lithium on the plastic film with controlled adhesion to the lithium by using a simple or assisted evaporating technique.

5. The method of claim 1, comprising obtaining said intermediate assembly by depositing the thin film of lithium on the plastic film with controlled adhesion to the lithium by using a technique for depositing the lithium in a melted state.

6. The method of claim 1, wherein the film of inert plastic material with controlled adhesion to the lithium is a polypropylene or polyethylene film, in which the surface in contact with the lithium film has been treated with the crown effect in order to provide it with the desired adhesion to the lithium.

7. The method of claim 1, comprising carrying out the application of the intermediate assembly onto said solid polymer electrolyte at a temperature below 60° C.

8. The method of claim 1, wherein the second component containing said solid polymer electrolyte film consists of a thin film of said electrolyte.

9. The method of claim 1, wherein the second component containing said solid polymer electrolyte film consists of a half-battery compound of a thin film positive electrode, one surface of which is covered with a film of polymer electrolyte, with the resulting assembly comprising a complete battery made up of a negative electrode and a lithium/solid polymer electrode/positive electrode.

10. The method of claim 9, comprising peeling, at least partially, the inert plastic film with controlled adhesion after producing the assembly, to provide for the collection of current or for the deposit of a metal collector.

11. The method of claim 1, wherein the thin film of lithium of the intermediate assembly has a thickness of between 1 and 50 microns.

* * * * *

UNITED STATES PATENT AND TRADEMARK OFFICE
CERTIFICATE OF CORRECTION

PATENT NO. : 4,897,917
DATED : FEBRUARY 6, 1990
INVENTOR(S) : GAUTHIER ET AL

It is certified that error appears in the above-identified patent and that said Letters Patent is hereby corrected as shown below:

Column 3, line 8, delete "lithium-assisted evaporation" and insert --assisted lithium-evaporation--;

line 48, delete "i na" and insert --in a--.

Column 4, line 25, delete "each" and insert --ease--.

Column 5, line 27, delete "becomem" and insert --become--;

line 40, insert --is-- after "it";

line 41, delete "tires" and insert --tries--, delete "thorugh" and insert --through--.

Column 7, line 27, delete "each" and insert --ease--;

line 38, delete "glycidylether methyl" and insert --methyl glycidylether--.

Columns 8-9, Claim 9, last three lines, delete "negative electrode and a lithium/solid polymer electrode/positive electrode." and insert --lithium-based negative electrode/solid polymer electrolyte/positive electrode.--.

UNITED STATES PATENT AND TRADEMARK OFFICE
CERTIFICATE OF CORRECTION

PATENT NO. : 4,897,917

DATED : FEBRUARY 6, 1990

INVENTOR(S) : GAUTHIER ET AL

It is certified that error appears in the above-identified patent and that said Letters Patent is hereby corrected as shown below:

Column 3, lines 28 and 36; Column 6, lines 51, 58 and 63; Column 8, line 55; delete "crown effect" and insert --corona effect--, each occurrence.

Signed and Sealed this

Sixth Day of August, 1991

Attest:

HARRY F. MANBECK, JR.

*Attesting Officer*  *Commissioner of Patents and Trademarks*